Figure 4:
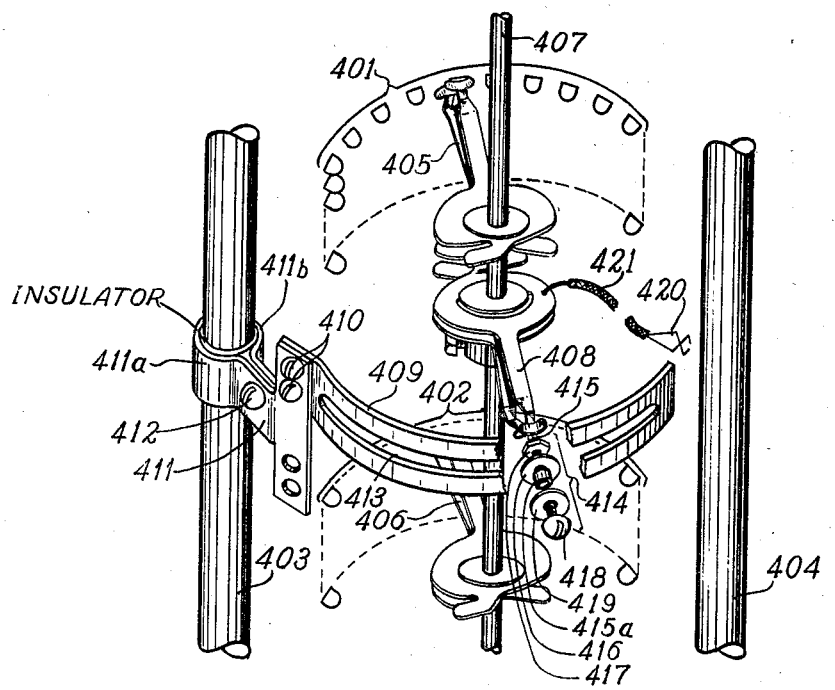

Feb. 10, 1942.  A. T. SIGO  2,272,311
TESTING AND INDICATING APPARATUS
Filed Jan. 4, 1939  4 Sheets-Sheet 1
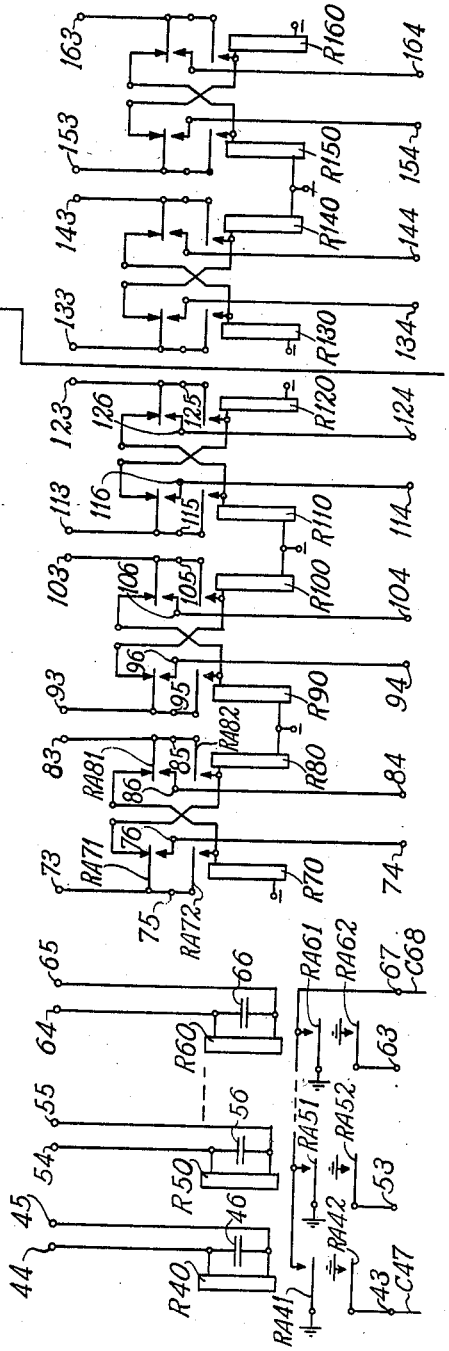

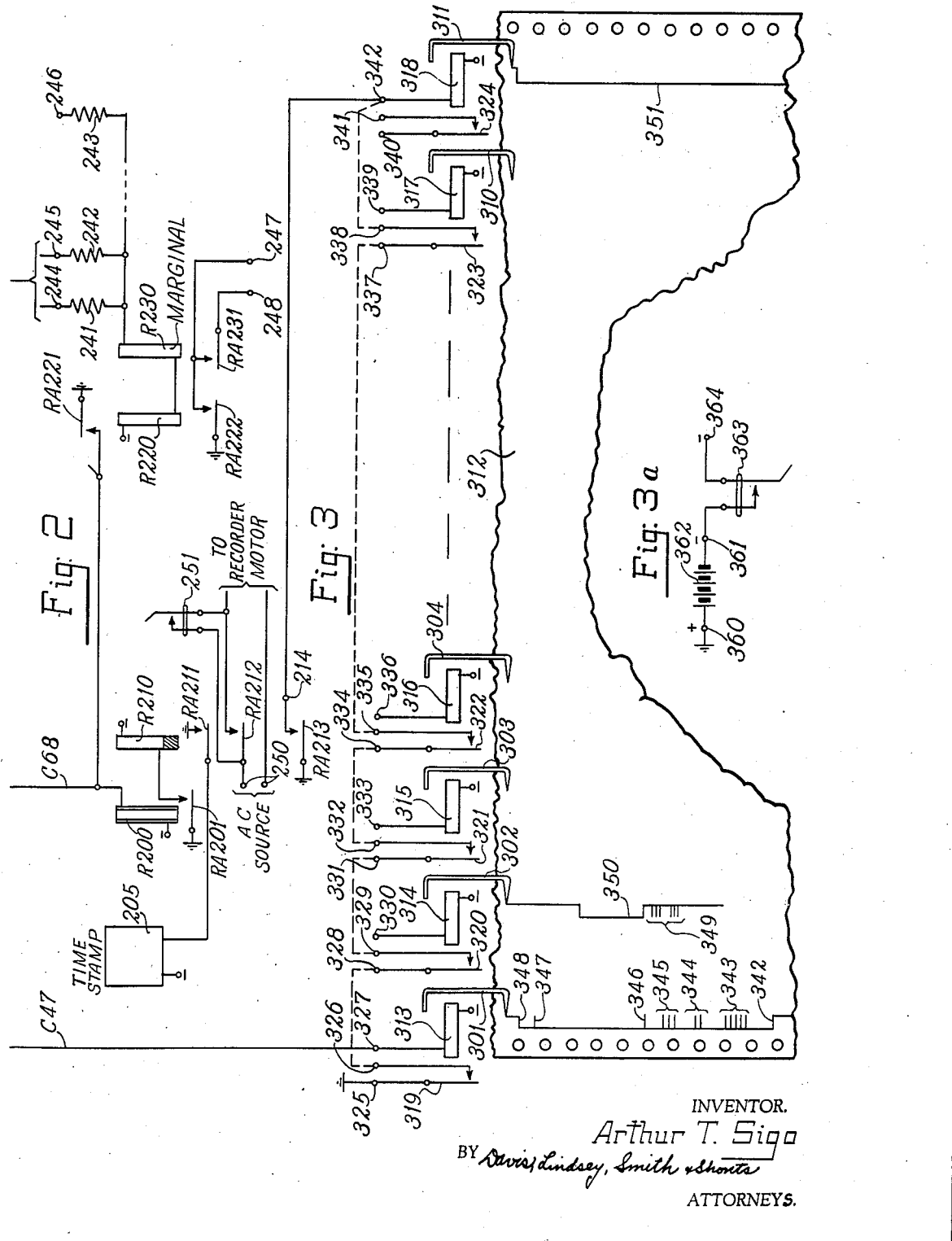

Feb. 10, 1942.　　　A. T. SIGO　　　2,272,311
TESTING AND INDICATING APPARATUS
Filed Jan. 4, 1939　　　4 Sheets-Sheet 3

INVENTOR.
Arthur T. Sigo
BY Davis, Lindsey, Smith & Shonts
ATTORNEYS.

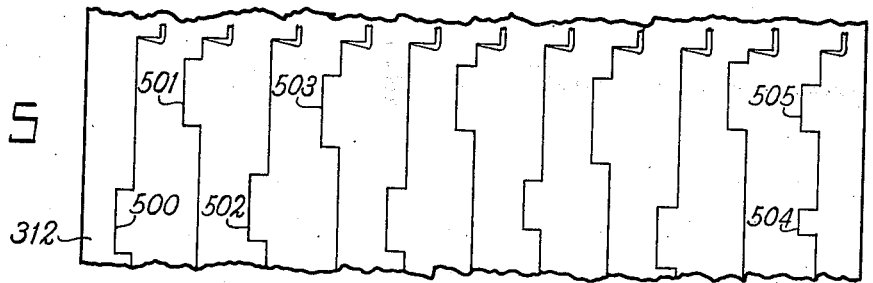
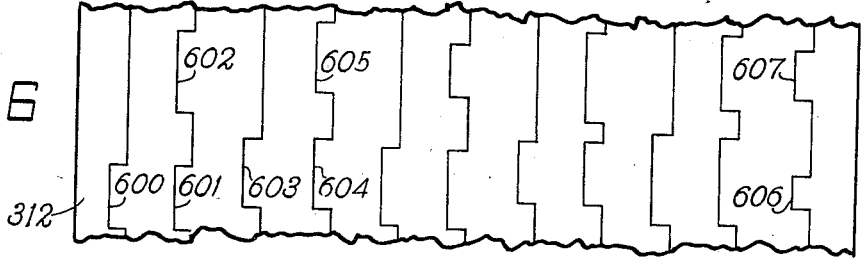
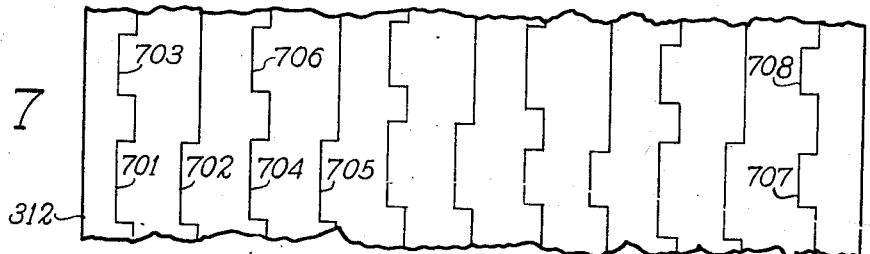
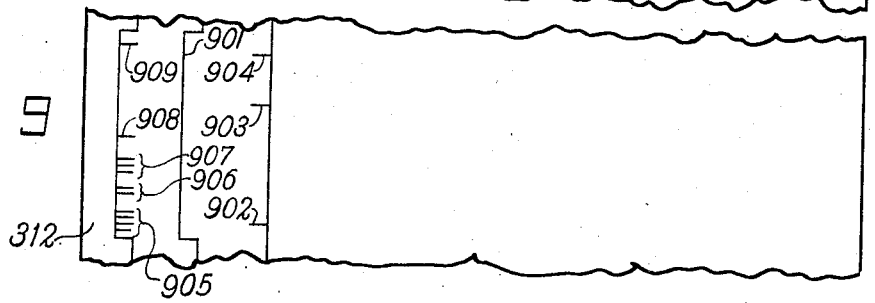

UNITED STATES PATENT OFFICE 2,272,311

TESTING AND INDICATING APPARATUS

Arthur T. Sigo, Maywood, Ill., assignor to Associated Electric Laboratories, Inc., Chicago, Ill., a corporation of Delaware Application January 4, 1939, Serial No. 249,281

61 Claims. (Cl. 179—8)

The present invention relates to testing and indicating apparatus and, more particularly, to improvements in apparatus for automatically testing and making observations with respect to the lines and automatic switches used in signaling and telephone systems.

In operating telephone exchanges it is frequently desirable to make observations with respect to certain lines and pieces of switching apparatus in order to determine such factors as traffic density, adequacy of available switching equipment and adequacy of available trunking facilities. For example, in an exchange where combined local and toll connector switches are utilized in establishing both toll and local connections, it may occur that during periods of heavy local traffic, when a large number of connector switches are required for handling the local calls, all of the combined toll and local connector switches will be tied up in local connections so that no switching facilities are available for completing toll connections. This condition, when it occurs, indicates an inadequate number of local connector switches in the exchange and can most readily be determined by observing the operation of the combined local and toll connector switches during those periods when the local traffic is at its peak. Again, in connection with subscribers' lines or private branch exchange trunk lines, it may occur that a particular line is used to such a great extent that a great number of calls incoming to the line cannot be completed and fail due to the busy condition of the line. In the last-mentioned case, information concerning the extent of use of the line, the number of calls routed to the line when it is busy, and whether the line is primarily occupied with incoming or outgoing calls is useful in determining whether additional telephone substation or trunking facilities should be provided for serving the subscriber to which the installed line extends.

It is an object of the present invention, therefore, to provide, in conjunction with a line selecting switch, such, for example, as a combined local and toll connector switch which is adapted to be seized over either of two routes incoming thereto, apparatus for indicating when the switch is busy and over which route it is seized.

It is another object of the invention to provide, in conjunction with a plurality of switches of the character described, improved apparatus for indicating when all of the switches are seized over corresponding ones of the two routes respectively incoming thereto.

It is a further object of the invention to provide, in conjunction with a line adapted to be utilized in a connection between two stations of a signaling system, improved apparatus for giving indications with regard to one or more of the following conditions: when the line is busy, the number of calls routed to the line when it is busy, and whether the line, when busy, is a calling or a called line.

It is a still further object of the invention to provide improved testing and indicating apparatus of the character described which is of simple, economical and compact arrangement, is easy to operate and is positive and reliable in operation.

In the illustrated embodiment of the invention, the improved testing and indicating apparatus is utilized in making observations upon the lines and switches of an automatic telephone system wherein switching apparatus is provided for handling both local and toll calls. More particularly, the automatic switching apparatus of the system comprises a plurality of automatic line selecting switches, in the form of combined local and toll connector switches, each of which may be seized over either of two routes, namely, over a route extending through a local switch train or over a route extending through a toll switch train. In accordance with one feature of the present invention, with the testing and indicating apparatus arranged in one manner means are provided in association with one of the combined local and toll connector switches for causing the indicating apparatus to indicate in one manner the busy condition of the switch when the switch is seized over one of the routes incoming thereto, and for causing the indicating apparatus to indicate in a different manner the busy condition of the switch when the switch is seized over the other of the routes incoming thereto. More particularly, the testing and indicating apparatus comprises a pair of indicating devices together with control apparatus operative to cause the operation of one of the devices when an associated line selecting switch of the character described is seized over one of the routes extending thereto and operative to cause the operation of the other indicating device when the associated switch is seized over the other of the routes extending thereto. Similarly arranged apparatus may be provided for observing the operation of a plurality of combined local and toll selector switches simultaneously and, in accordance with a further feature of the invention, an additional indicating device is provided which is controlled by the several sets of testing and indicating apparatus in such manner that it is only operated to give an indication when all of the plurality of automatic switches under observation are seized over corresponding ones of the two routes respectively extending thereto. More particularly, the apparatus may be arranged so that if all of the combined local and toll connector switches under observation are occupied with calls of a local character, the additional indicating device is operated. Alternatively, the apparatus may be arranged in a manner such that if all of the combined local and toll connector switches under observation are occupied with toll calls, the additional indicating device is caused to operate. As a further alternative the apparatus may be so arranged that the additional indicating device is caused to operate when all of the switches under observation are busy regardless of the routes over which the switches are individually seized.

In making observations with respect to a particular line of the system, the testing and indicating apparatus is arranged in a different manner such that one of the indicating devices is caused to operate when the line under observation becomes busy and the testing apparatus causes another of the indicating devices to operate each time a call is routed to the line at a time when the line is busy. When desired, additional control apparatus is provided for causing a third of the indicating devices to indicate whether the busy condition of a line under observation is due to an incoming or outgoing call originating on the line.

Further features of the invention pertain to the particular arrangement of the testing and indicating apparatus whereby the above and additional operating features are attained.

The novel features believed to be characteristic of the invention are set forth with particularity in the appended claims. The invention, both as to its organization and method of operation, together with further objects and advantages thereof, will best be understood by reference to the specification taken in connection with the accompanying drawings in which Figure 1 illustrates, in schematic form, an automatic telephone system upon which observations of the character outlined above may be made and certain of the testing apparatus for carrying out the observations; Fig. 2 illustrates additional portions of the testing apparatus adapted for use in making observations with respect to the system of Fig. 1; Fig. 3 illustrates, in schematic form, one form of indicating apparatus adapted for use in conjunction with the testing apparatus shown in Figs. 1 and 2; Fig. 3a illustrates the circuit through which current is supplied to the testing apparatus; Fig. 4 illustrates the mechanical construction of a circuit controlling attachment to be used in conjunction with certain of the line selecting switches shown in Fig. 1 when certain observations are to be made; and Figs. 5 to 9, inclusive, are graphs illustrating segments of typical records obtained through operation of the testing and indicating apparatus.

Referring now more particularly to Fig. 1 of the drawings, the automatic telephone system there illustrated comprises a plurality of subscribers' lines, two of which are indicated at 10 and 11 as extending to substations A and B, respectively, together with automatic switching apparatus comprising a line switch 12, a local selector switch 13 and a local connector switch 14 for setting up local connections between the various lines of the system. The system further comprises a toll operator's position 18 from which calls may be routed to any one of the subscribers' lines of the system through a toll switch train comprising a toll selector switch 19 and a plurality of combined local and toll connector switches, one of which is indicated at 16. The last-mentioned switches are also adapted to be utilized in completing local connections between the subscribers' lines of the system, the arrangement being conventional in that these switches are only assigned for use in completing local calls when all of the available local connector switches are busy. Although the automatic switching apparatus just described may be of any desired construction and arrangement, preferably the line switch 12 is of the well-known rotary type, and the selector switches 13, 14, 16 and 19 are of the well-known Strowger type, utilizing dual motion switching mechanism for performing the line selecting functions. The apparatus provided at the toll operator's position 18 is also of conventional form and arrangement, it being pointed out that the trunk line extending to the toll selector switch 19 is accessible to an operator's cord circuit provided at the operator's position 18 through a call and answer jack, not shown, by way of which calls routed to the operator's position 18 are extended to the desired substations of the system.

Referring briefly to the operation of the system, if a subscriber, such, for example, as the subscriber at the substation A, initiates a call by lifting the receiver at this substation from its supporting hook or cradle, a bridge circuit is established by way of the conductors 21 and 22 of the line 10 to the line switch 12 individually associated with this line. When this circuit is established, the line switch 12 operates in a well known manner to select an idle one of the local selector switches in the group including the switch 13. The line switch 12 also functions to impress ground potential upon the control conductor 23 of the line 10, thereby to mark the calling line 10 as busy in the bank contacts of the connector switches having access thereto. If, for example, the local selector switch 13 is seized by the line switch 12, when this selector switch is taken for use the calling loop circuit is extended thereto and the control apparatus thereof is conditioned to respond to the impulses of the first digit of the directory number designating the desired substation. When this digit is dialed at the calling substation A, the wipers of the Strowger switching mechanism embodied in the selector switch 13 are elevated to a position opposite the level of bank contacts terminating the trunk lines extending to the connector switches having access to the desired line. At the end of the digit the selector switch 13 operates in the usual manner automatically to select an idle one of the connector switches of the selected group. In this regard it is pointed out that in each instance when the local selector switches have access to the combined local and tool connector switches, the trunk lines extending to the local connector switches are terminated in the first contact sets of the respective levels, while the trunk lines extending to the combined local and toll connector switches are terminated in the last contact sets of the levels. By this arrangement the local connector switches are always assigned for use in preference to the combined local and toll connector switches so long as an idle one of the local connector switches is available. Hence, the combined local and toll connector switches are only utilized as overflow switches in so far as local calls are concerned. Assuming, for example, that the local connector switch 14 is the first available idle switch of the selected group, when the selector switch 13 operates to position its wipers on the contacts terminating the trunk line 15 extending to the connector switch 14, the calling loop circuit is switched through to the indicated connector switch and the control apparatus thereof is conditioned to respond to the final two line selecting digits of the directory number designating the desired substation. When the second digit is dialed, the connector switch 14 responds by elevating its wipers to a position opposite the level of bank contacts terminating the group of ten lines including the desired called line. For example, if the line 11 extending to the substation B is the called line, the connector switch operates to select the group of lines including this line when the second digit is dialed at the calling substation. Thereafter and when the third digit is dialed, the wipers of the connector switch 14 are rotated into engagement with the contacts terminating the conductors of the called line 11. Following this operation, the called line is tested, in the usual manner, to determine the idle or busy condition thereof and busy tone is returned to the calling subscriber in the event the called line is occupied with a call. Alternatively, if the called line is idle, the connector switch 14 operates to impress ground potential upon the control conductor thereof to busy the line to the other connector switches having access thereto, and to cause ringing current to be projected over the line, thereby to energize the ringer or signal device provided at the called substation B. Finally, the desired conversational circuit is established between the calling and called subscribers when the call is answered at the called substation B. When the call is answered at the called substation, the battery reversing relay conventionally provided in the connector switch 14 operates to reverse the direction of current flow over the loop extending through the switches 13 and 12, and over the line 10 to the calling substation. In this regard it is pointed out that transmission current is supplied to the coupled calling and called loop circuits, respectively, through the windings of the line and back bridge relays conventionally provided in the connector switch, and is derived from the exchange battery in the usual manner. The release of the established connection may be effected in any desired manner, although preferably the circuit arrangement of the local connector switch 14 is such that the operated switch train is released only when the connection is cleared out at both the calling and called substations. Regardless of the mode of releasing the operated switch train, when the called party hangs up to interrupt the loop circuit extending to the called substation, the battery reversing relay embodied in the connector switch 14 functions to again reverse the direction of current flow over the loop extending to the calling substation, assuming, of course, that the called subscriber is the first to abandon the connection. Battery current reversals of the character described are utilized for various control functions, such, for example, as call metering and call supervision.

As indicated above, the call originating at the substation A may be routed to the called line 11 over a connection including one of the combined local and toll connector switches having access thereto, provided all of the local connector switches accessible to the local selector switch 13 and having access to the called line are busy at the time the call is initiated. For example, if all of the local connector switches in the group including the switch 14 are busy at the time the call originates at the substation A, the selector switch 13 may operate during the rotary movement of its switch wipers to seize the combined local and toll connector switch 16 over the trunk line 17, assuming the line 17 is the first idle line tested. In this case, the connection is forwarded to the called line 11 through the combined local and toll connector switch 16 in a manner substantially similar to that described above with reference to the local connector switch 14, it being pointed out that immediately the connector switch 16 is seized by the selector switch 13, ground potential is impressed upon the release or private conductor of the trunk line 17 and also upon the release or private conductor 30 of the trunk line 20, thereby to render the switch 16 inaccessible to the local and toll selector switches having access thereto. After the connection is cleared out and during the release of the operated switch train, ground potential is removed from the control conductors of the trunk lines 17 and 20 when the combined local and toll connector switch 16 and the selector switch 13 are restored to normal.

Toll calls routed to the operator's position 18 may be extended to the desired substations through toll switch trains each including one of the toll selector switches and a combined local and toll connector switch. For example, if a toll call routed to the operator's position 18 is to be extended to the substation B associated with the line 11, the operator attending the position 18 may seize the toll selector switch 19 and dial the three digits of the directory number designating the line 11. The selector switch 19 responds to the impulses of the first digit by operating to select the group of combined local and toll connector switches having access to the called line. Thereafter, the selector switch 19 operates automatically to select an idle one of the selected group of connector switches. Assuming, for example, that the combined local and toll connector switch 16 is the first available switch of the selected group, when the wipers of the selector switch 19 are positioned on the contacts terminating the conductors of the trunk line 20, ground potential is impressed upon the release conductor 30 of the trunk line 20, the selector switch 19 functions to switch the pulsing circuit through to the seized connector switch 16, and the control apparatus of the last-mentioned switch is conditioned to respond to the impulses of the final two line selecting digits of the directory number designating the line 11. This control apparatus also functions to impress ground potential upon the private or release conductor of the trunk line 17, thereby to mark the connector switch 16 as busy in the bank contacts of the local selector switches having access thereto. From this point on, the connection may be routed to the called line 11 in the exact manner explained above. Assuming that the desired connection is obtained, supervision thereof is maintained through the signaling operations of the supervisory lamps conventionally provided at the operator's position 18. In the present case, the release of the established connection is entirely under the control of the operator attending the operator's position 18, the operator being informed by the condition of the supervisory lamps at this position as to when the connection is ready to be released. Upon receiving the usual disconnect signal, the operator may clear out the connection, thereby to cause the sequential restoration of the connector switch 16 and the selector switch 19 in the order named. Following the release of the indicated switches, ground potential is removed from the private conductors of each of the trunk lines 17 and 20, thereby to mark the connector switch 16 as idle.

Referring now more particularly to the testing and indicating apparatus briefly referred to above and considering first the testing apparatus shown in Fig. 1, this apparatus comprises a plurality of line test relays R40, R50, R60, etc., each of which includes a winding adapted to be serially included in one side of a line upon which observations are to be made. A capacitance shunt for the winding of each of the line relays is provided in order to prevent the winding impedances from interfering with the transmission of voice frequency currents over the associated lines. Thus, the relays R40, R50 and R60 are shunted by voice frequency current by-pass condensers 46, 56 and 66, respectively. The windings of the relays R40, R50, R60, etc., are connected to terminals through which connections may be made to the conductors of the lines to be observed. For example, the winding of the relay R40 is connected to the terminals indicated at 44 and 45, respectively. In a similar manner, the terminals indicated at 54, 55 and 64, 65 are provided for making connections to the relays R50 and R60, respectively. Each of the enumerated line test relays is equipped with two armatures, one of which is adapted to impress ground potential upon a common control conductor extending to a terminal 67, and the other of which is operative to impress ground potential upon a control terminal individual to the corresponding relay. For example, the lower armature RA42 of the relay R40 is arranged to connect ground potential to a terminal 43 individually associated with the relay R40. Corresponding terminals 53 and 63 are individually associated with the relays R50 and R60, respectively.

For the purpose of making observations with respect to the operation of the combined local and toll connector switches of the system, and of making additional observations described with particularity hereinafter, there is also provided a plurality of relays R70, R80, R90, R100, R110, R120, R130, R140, R150 and R160, which relays are arranged in pairs, each pair being adapted to be associated with one of the combined local and toll connector switches upon which an observation is to be made. The circuit connections extending to each pair of relays include a pair of test terminals through which connections are made to appropriate conductors of a trunk line incoming to a switch which is to be tested, two such terminals being indicated at 73 and 83 in association with the pair of relays R70 and R80. The corresponding terminals associated with the pair of relays R90 and R100 are indicated at 93 and 103, respectively. The remaining terminals 113, 123, 133, 143, 153 and 163 are similarly included in the circuit connections extending to the remaining three sets of test relays. The circuit connections controlled by each pair of the enumerated test relays also include a pair of terminals through which connections are made to the indicating apparatus shown in Fig. 3, this pair of terminals, as included in the connections controlled by the relays R70 and R80, being indicated at 74 and 84. A corresponding pair of terminals 94 and 104 are provided in the circuit connections controlled by the second pair of relays R90 and R100. The remaining terminals 114, 124, 134, 144, 154 and 164 are similarly included in the circuit connections controlled by the remaining three sets of test relays. A plurality of additional terminals 75, 76, 85 and 86 are provided in the circuit connections controlled by the pair of relays R70 and R80 for certain specific control purposes to be described subsequently. Corresponding additional terminals are also provided in the circuit connections controlled by each of the other pairs of test relays.

In order to make observations with respect to the busy condition of a line and the number of calls routed to a line at a time when the line is busy, there is also included in the testing apparatus a pair of control relays R220 and R230, which relays are arranged to be energized in series over an operating circuit comprising a plurality of branches individually including the resistors 241, 242, 243, etc. The relay R230 is of the marginal type such that it does not operate when a single one of the above-mentioned branch circuits is completed, but only operates when two or more of these branch circuits are completed. The relay R220, on the other hand, is highly sensitive in that it is constructed to operate when one or more of the above-mentioned branch circuits is completed. The relays R220 and R230 are arranged to control circuits extending by way of the terminals 247 and 248 to the indicating apparatus shown in Fig. 3.

The control apparatus of the testing and indicating device further includes a slow-acting start relay R200 which is arranged to be energized in response to operation of any one of the line test relays R40, R50, R60, etc., or in response to any one of the relays corresponding to and including the relay R220. This slow-acting relay is arranged to control a slow-to-release slave relay R210 which is provided for controlling a time stamp 205 and certain additional circuits referred to with particularly hereinafter.

The indicating apparatus is in the form of a recorder of the multipen type, and, preferably, is of the improved construction and arrangement disclosed and claimed in Patent No. 2,132,808—Sigo, granted October 11, 1938. Briefly described, this recorder comprises a plurality of marking elements, six of which are indicated at 301, 302, 303, 304, 310 and 311, respectively. Each marking element includes a stylographic pen arranged normally to engage a paper record strip 312 which is adapted to be unwound from a winding spool and to be moved over a driving cylinder at two or more different and uniform rates. Each marking element further comprises an operating magnet, those embodied in the enumerated elements being indicated at 313, 314, 315, 316, 317 and 318, respectively. Each magnet, when energized, is adapted to operate the associated pen to an off-normal position so that an off-trace line is inscribed upon the record strip. Each marking element further includes a pair of armature springs which are operated into engagement when the operating magnet of the element is energized, the armature controlled by the magnets 313 to 318, inclusive, being indicated at 319 to 324, inclusive. In the arrangement illustrated, a recorder comprising eleven marking elements is required fully to utilize the line testing capacity of the testing apparatus described above. For the purpose of moving the record strip relative to the marking pens there is provided a small synchronous motor, not shown, which is arranged to rotate the driving cylinder of the recorder through a changeable speed reducing gear mechanism, not shown. This driving motor is connected to be energized from a suitable alternating current source connected to the terminals 250 over a circuit including the armature springs controlled by RA212 and the springs of a switch 251 arranged in parallel circuit relation in the manner shown.

In testing the lines and switches of the system shown in Fig. 1, current for energizing the various test relays and the operating magnet of the time stamp 205 may be derived from the exchange battery. More particularly, the testing apparatus includes, as shown in Fig. 3a, a pair of terminals 360 and 361 to which the terminals of the exchange battery, indicated at 362, are adapted to be connected. The positive terminal 360 is connected over a bus conductor to each of the terminals and conductors indicated in the drawings as terminating at ground, while the terminal 361 is adapted to be connected through the springs of a switch 363 and a terminal 364 to each of the terminals indicated in Figs. 1 and 2 of the drawings as extending to the negative terminal of the current supply source. More particularly, the terminal 364 is permanently wired to each of the terminals shown in Figs. 1 and 2 as terminating at the negative terminal of the current source. Also, the negative terminal of the source 362 is wired to the negative terminals of the operating magnets embodied in the recorder shown in Fig. 3. For convenience in describing the circuits, the various bus connections have been omitted from the drawings.

In constructing the testing apparatus described above, the various elements thereof are preferably assembled as a unit. Due to the simplicity of the apparatus, the assembled unit may be of small size for easy portability. As assembled, the unit preferably includes a supporting structure upon which the various relays shown in Figs. 1 and 2 are mounted and a terminal block or panel upon which the various terminals and control switches are mounted. The recorder illustrated in Fig. 3 is, of course, a separate unit and is provided with a terminal block through which desired connections may be made to the terminal block of the test unit.

The apparatus as described above may be used for observing the operation of from one to ten subscribers' lines simultaneously. Lines requiring such observation are usually those with respect to which subscribers have made complaints regarding the service obtained. In some instances these complaints have no apparent foundation since the switching equipment proves to be in proper working order when subjected to test. In order, therefore, to determine if the complaints are justified, it is desirable to make observation with respect to the lines so that detailed observations of the operations occurring incident to the initiation and completion of calls involving the lines may be studied. For example, it is advisable to obtain a record with respect to a line of the character indicated, which shows when the receiver at the calling substation is removed to initiate a call, when the dialing operation is started, the number actually dialed, the length of the ringing period, the instant when the called subscriber answers, assuming a response is obtained, and the holding time of the call or the duration of the conversation. By utilizing the ten test relays R40, R50, R60, etc. and ten pens of the recorder shown in Fig. 3, studies of the character just described may be made upon ten lines simultaneously. If the above observations are to be made with respect to the line 10, for example, one side of this line is opened and the winding of the relay R40, as shunted by the condenser 46, is serially included therein. To this end, the terminals 24 and 25, embodied in the distributing frame through which the line 10 is connected to the automatic switching apparatus, are disconnected from each other, the terminal 24 is connected to the terminal 44, and the terminal 25 is connected to the terminal 45. In a similar manner, the windings of the other relays in the group including the relays R40, R50 and R60 may serially be included in other lines upon which observations are to be made. The relay R40 is connected to control one of the marking elements embodied in the recorder. To this end, the terminal 43 individual to the relay R40, may be strapped to the terminal 327, individual to the operating magnet 313 of the marking element 301. The other line test relays are similarly connected individually to control others of the marking elements embodied in the recorder. If desired, the slave relay R210 may be connected to control one of the marking elements of the recorder for the purpose of recording the operation of any one of the line test relays. To this end, the terminal 214 is strapped to the terminal 342, individual to the operating magnet 318 of the eleventh marking element 311. When a testing operation is to be started, the current supply switch 363 is operated to bring the contact springs thereof into engagement, thereby to prepare the circuits, traced hereinafter, for energizing the various test relays, the relays R200 and R210, and the operating magnet of the time stamp 205. The switch 251 is left in its normal position while making tests of the character under consideration.

With the apparatus connected in the manner just described, each of the line test relays serially included in one of the lines upon which observations are to be made is caused to operate when a loop circuit is established by way of the associated line and is caused to restore when the loop circuit is interrupted. Thus, the marking elements individually associated with the test relays are caused to make complete records of all calls routed by way of the respective associated lines. For example, when a call is initiated at the substation A the relay R40 is energized over the calling loop circuit established when the calling subscriber removes his receiver from its hook and operates to complete, at RA42, a circuit extending by way of the terminal 43, the strapping conductor C47 and the terminal 327 for energizing the operating magnet 313 of the marking element 301. As a result, the marking element 301 is operated to a position for inscribing an off-trace line upon the record strip 312. At RA41, the relay R40, upon operating, completes a circuit extending by way of the terminal 67 and C68 for energizing the slow-acting relay R200. The last-mentioned relay, in turn, operates to complete, at RA201, an obvious circuit for energizing the slow-to-release relay R210. When the relay R210 operates it functions to complete, at RA211, an obvious circuit for causing the operation of the time stamp 205. At RA212, the relay R210, upon operating, completes a circuit for energizing the driving motor of the recorder, thereby to initiate movement of the record strip 312 relative to the pens of the various marking elements. At RA213, the relay R210 completes a circuit extending by way of the strapped terminals 214 and 342 for energizing the operating magnet 318 of the eleventh marking element 311, causing this element to operate to inscribe an off-trace line upon the record strip 312. During the dialing operation performed at the calling substation and each time the loop circuit including the winding of R40 is momentarily interrupted, this relay momentarily restores to open, at RA42, the above-traced operating circuit for the magnet 313 causing the marking element 301 momentarily to restore to its normal position. Due to the slow-to-release characteristics of the relays R200 and R210, the last-mentioned relays do not restore in response to the alternate restoration and operation of the relay R40 occurring during impulsing. Hence, the circuit for energizing the driving motor of the recorder, the circuit for energizing the operating magnet of the time stamp 205, and the circuit for energizing the operating magnet 318 of the marking element 311 are not interrupted in response to the dialed pulses. Since the marking element 301 is deflected between its off-normal and normal positions during each dialed impulse, a complete record of the digits dialed is obtained. Following the dialing operation, the loop circuit established by way of the calling line is held completed so that the relay R40 remains in its operated position and the marking element 301 is maintained in its operated off-normal position. Thus, the waiting period, during which the ringing of the called substation occurs, is indicated on the record strip. When the call is answered at the called substation the connector switch through which the connection is established operates to reverse battery back over the calling loop circuit in the manner previously described. As a result, the relay R40 is momentarily deenergized and restores for a short time interval to open the above-traced operating circuit for the magnet 313. The momentary deenergization of the magnet 313 causes the pen of the marking element 301 momentarily to be restored to its normal position, thus indicating that the call has been answered. From this time on, the marking element 301 is held in its off-normal position until the connection is cleared out at the called substation, at which time battery is again reversed back over the loop extending to the calling substation to cause the momentary restoration of the relay R40 and the momentary deenergization and restoration of the magnet 313. From this point on, the pen of the marking element 301 is held in its off-normal position until the connection is cleared out at the calling substation at which time the relay R40 is deenergized and restores to open the operating circuit for the magnet 313, thereby to cause the restoration of the marking element 301.

The character of a typical record obtained during a call of the character just described is depicted to the left of Fig. 3 wherein the first deflection 342 of the marking element 301 indicates the initiation of the call; the four momentary deflections of the marking element grouped together and indicated at 343 indicate the dialing of a first digit of four impulses; the two momentary deflections grouped together and indicated at 344 indicate the dialing of a second digit of two impulses; the three momentary de-deflections grouped together and indicated at 345 indicate the dialing of a third digit of three impulses; the momentary deflection 346 indicates the point at which the called party answers the call; the interval between the deflection 346 and the deflection 347 indicates the holding time of the call; the deflection 347 indicates the instant when the called subscriber hangs up; and the line 348 indicates the instant when the connection is cleared out at the calling substation.

A typical record of a call incoming to a line under observation is shown in Fig. 3 as being inscribed upon the record strip 312 by the second marking element 302. In this record the momentary deflections of the marking element 302 indicated at 349 illustrate the response of the second testing relay R50 to the ringing current projected over the line in which this relay is serially connected. Following the ringing operation and when the called party answers the call, the relay R50 is held in its operated position to maintain the operating magnet 314 of the second marking element 302 energized, so that the marking pen of this element is caused to inscribe an off-trace line upon the record strip for the duration of the call. Thus, the length of the off-trace line 350 indicates the holding time of the call, the point at which this off-trace line is terminated indicating the instant when the called subscriber hangs up.

Since the start relay R200 is held energized so long as any one of the test relays R40, R50, R60, etc. are operated, it will be apparent that the eleventh marking element 311 is held operated to inscribe an off-trace line upon the record strip 312 so long as a call is present upon any one of the lines undergoing observation. Thus, the off-trace line 351 inscribed upon the record strip 312 by the marking element 311 indicates an interval during which one or more of the test relays R40, R50, R60, etc. are operated. When all of these relays are deenergized, indicating that the respective associated lines are not occupied with calls, the operating circuit for the relay R200 is interrupted, causing the last-mentioned relay to restore to open, at RA201, the operating circuit for the slow-to-release relay R210. The last-mentioned relay, in turn, restores to open the circuit for energizing the operating magnet of the time stamp 205, the operating circuit for the magnet 318, and the operating circuit for the motor which drives the recorder. Thus, movement of the record strip 312 is arrested. When the magnet 318 is deenergized, the recording pen of the marking element 311 is permitted to return to its normal position so that the off-trace line being inscribed by this pen upon the record strip 312 is ended.

In utilizing the apparatus to make observations concerning the operating of certain of the automatic switches embodied in the telephone system described above, one set or pair of the relays R70, R80, R90, R100, etc. is associatd with each switch upon which tests are to be conducted. For example, if it is desired to observe the operation of the combined local and toll connector switch 16, the pair of relays R70 and R80 may be utilized to control the operation of a pair of the marking elements embodied in the recorder shown in Fig. 3. To this end, the private or release conductor 30 of the trunk line 20 extending to the switch 16 is opened at the distributing frame, the terminal 32 terminating the section 30a of this conductor is connected to the terminal 73, and the terminal 33 terminating the conductor section 30b is connected to the terminal 83. In order operatively to associate the two relays R70 and R80 with the marking elements 301 and 302 of the recorder shown in Fig. 3, the terminal 74 is strapped to the terminal 327 and the terminal 84 is strapped to the terminal 330. In a similar manner, each of the other pairs or sets of relays in the plurality of relays R90, A100, R110, R120, etc., may operatively be associated with another of the combined local and toll connector switches and with another pair of pens embodied in the recorder. In making observations with respect to the combined local and toll connector switches, the speed at which the record strip 312 is moved relative to the pens of the recorder is adjusted to a low rate so that an excess amount of the record strip will not be used. The desired speed may be obtained by adjusting the gear ratio of the speed reducing gear mechanism through which power is transmitted from the driving motor to the driving cylinder of the recorder. During a testing operation of the character under consideration the record strip is continuously driven. To this end, the switch 251 is actuated so that its contact springs are moved into engagement to complete the operating circuit for the driving motor of the recorder.

With the apparatus arranged in the manner just described, if a connection is routed through a toll switch train and by way of the trunk line 20 to the combined local and toll connector switch 16, the relay R80 is energized and operates. More particularly, when the trunk line 20 is seized by one of the toll selector switches, as, for example, the switch 19, ground potential is impressed upon the private conductor section 30a, thereby to complete a circuit for energizing the relay R80, this circuit extending by way of the grounded conductor 30a, the terminals 32 and 73, RA71 and its associated resting contact, and the winding of R80 to battery. When energized over this circuit, the relay R80 operates to complete a path for connecting the private conductor sections 30a and 30b together, this path extending by way of the terminals 32 and 73, RA71, RA82 and the terminals 83 and 33 to the conductor 30b. Upon operating, the relay R80 also completes a circuit for energizing the operating magnet 314 of the second marking element 302, this circuit extending by way of the grounded conductor 30a, the terminals 32 and 73, RA71, RA82, RA81, the terminals 84 and 330, and the winding of the magnet 314 to battery. As a result, the marking element 302 is operated to inscribe an off-trace line upon the record strip 312. Since ground potential is retained upon the conductors 30a and 30b for the duration of the call, the relay R80 is maintained in its operated position until the operated switch train is released. Accordingly, the length of the off-trace line inscribed upon the record strip 312 by the second marking element 302 is a measure of the period during which the switch 16 is operated. On the type of call just described wherein the switch 16 is seized over the trunk line 20 extending only to the bank contacts of the toll selector switches, operation of the second marking element 302 to inscribe a line upon the record strip 312 indicates that the switch 16 is occupied with a toll call. Alternatively, if the switch 16 is seized over the trunk line 17 accessible only to the local selector switches, the relay R70 and the first marking element 301 are caused to operate, thus indicating that the switch 16 is occupied with a local call. More particularly, when the trunk line 17 is seized by one of the local selector switches, such, for example, as the switch 13, having access thereto, the control apparatus of the connector switch 16 operates to impress ground potential upon the section 30b of the private or release conductor 30, thereby to complete a circuit for energizing the relay R70, this circuit extending by way of the grounded conductor 30b, the terminals 33 and 83, RA81 and its associated resting contact, and the winding of R70 to battery. Upon operating, the relay R70 connects the conductors 30b and 30a together over a path including the terminals 33 and 83, RA81, RA72 and the terminals 73 and 32. Thus, ground potential is impressed upon the private conductor section 30a to mark the connector switch 16 as busy in the bank contacts of the toll selector switches. Upon operating, the relay R70 also completes a circuit for energizing the operating magnet 313 of the first marking element 301, this circuit extending by way of the grounded conductor 30b, the terminals 33 and 83, RA81, RA72, RA71, the terminals 74 and 327, and the winding of the magnet 313 to battery. The resulting operation of the marking element 301 causes an off-trace line to be inscribed upon the record strip 312, which off-trace line endures until the connection is released to cause the deenergization and restoration of the relay R70 and the operating magnet 313. From the foregoing description, it will be apparent that in the event the combined local and toll connector switch 16 is seized over the route including the trunk line 17, the marking element 301 is caused to operate, whereas when the indicated switch is seized over the trunk line 20 from a toll selector switch, the marking element 302 is caused to operate. Thus, a reliable indication is given as to the type of calls primarily served by the combined local and toll connector switch 16. In the event the other four pairs of test relays R90, R100; R110, R120; R130, R140; and R150, R160, shown in Fig. 1, are similarly associated with additional pairs of marking elements embodied in the recorder shown in Fig. 3 and with other combined local and toll connector switches, observations with respect to five switches may be made at the same time.

With the first ten pens of the recorder arranged to give indications of the character just described with respect to five combined toll and local connector switches, the eleventh marking element 311 may be utilized to indicate when all of the switches are busy with the same type of call. For example, the eleventh marking element may be controlled in such a manner that it operates when all five of the switches under observation are occupied with toll calls. Alternatively, this marking element may be connected to operate when all five of the switches under observation are simultaneously occupied with local calls. To this end, a chain circuit for energizing the operating magnet 318 of the eleventh marking element 311 is formed by strapping the armature springs controlled by the operating magnets of the first ten marking elements. More particularly, the terminal 325 connected to the armature 319 of the operating magnet 313 embodied in the first marking element 301 is connected to ground; the terminal 326 is connected to the terminal 328 associated with the operating magnet 314 of the second marking element; the terminal 329 is strapped to the terminal 331; the terminal 332 is strapped to the terminal 334; and so on, the chain continuing through the armature springs controlled by the operating magnets of the other six marking elements. With the indicated armature springs strapped in this manner, the chain circuit can only be completed when all ten of the marking elements are operated, which, with the test circuits arranged in the manner described above, is an impossibility.

In order to arrange the chain circuit so that the eleventh marking element is operated when the five switches under observation are simultaneously occupied with local calls, the armature springs controlled by the operating magnets of the respective even numbered marking elements are strapped together so that these operating magnets have no effect upon the chain circuit. More particularly, the terminals 328 and 329 are connected together; the terminals 334 and 335 are strapped; and the armature springs controlled by the operating magnet 317 are shunted by strapping the terminals 337 and 338. In a similar manner, the armature springs controlled by the operating magnets of the sixth and eighth marking elements are by-passed or shunted out of the chain circuit. With the indicated armature springs shunted, the chain circuit is completed only when the operating magnets of the respective odd numbered marking elements are all operated, which occurs only when all five of the combined local and toll connector switches under observation are occupied with local calls, as will be apparent from the foregoing description. When all five of the odd numbered marking elements are operated, the chain circuit may partially be traced as extending from ground at the terminal 325 by way of the operated armatures 319, 321, etc. of the operating magnets embodied in the first, third, fifth, seventh and ninth marking elements, the terminal 341 and the winding of the magnet 318 to battery. When energized over this circuit, the pen of the marking element 311 is moved to its off-normal position to inscribe an off-trace line upon the record strip 312. Since the chain circuit just traced is held completed only so long as the respective odd numbered marking elements are all operated, this circuit will be interrupted immediately one of the five switches under observation is released. When the chain circuit is broken, the magnet 318 is deenergized and the marking element 311 is restored to its normal position to terminate the off-trace line. The length of the off-trace line inscribed upon the record strip by the marking element 311 is a measure of the time during which all of the switches under observation were occupied with local calls.

If it is desired to arrange the chain circuit, as described above, so that the eleventh marking element 311 is operated only when the five switches under observation are simultaneously occupied with toll calls, the armature springs controlled by the operating magnets of the respective odd numbered marking elements are shunted out of the chain circuit rather than the armature springs controlled by the operating magnets of the respective even numbered marking elements. More particularly, the terminals 325 and 326 are connected together, the terminals 328 and 329 are left unstrapped, the terminals 331 and 332 are connected together, the terminals 334 and 335 are left unstrapped, and so on. By virtue of this arrangement, the chain circuit for energizing the marget 318 is only completed when the five even numbered marking elements are all operated. Since the coincident operation of the even numbered marking elements occurs only when all of the switches under observation are occupied with toll calls, it will be apparent that the marking element 311 is only operated to inscribe an off-trace line upon the record strip 312 during those intervals when the switches under observation are busy due to toll calls routed by way thereof.

The character of a typical record inscribed upon the record strip 312 by the first ten pens of the recorder when these pens are connected to be controlled in the manner just described, as illustrated in Fig. 5 wherein the off-trace line 500 inscribed upon the record strip 312 by the first marking element 301 indicates an interval during which the combined local and toll connector switch was occupied with a local call, and the off-trace line 501 inscribed upon the record strip by the second marking element 302 indicates an interval during which the switch 16 was busy due to a toll call routed by way thereof. In a similar manner, the off-trace line 502 inscribed upon the record strip 312 by the third marking element 303 designates an interval during which the second of the switches under observation was occupied with a local call, and the off-trace line 503 inscribed upon the record strip by the fourth marking element 304 indicates an interval during which the second combined local and toll connector switch was occupied with a toll call. The remaining off-trace lines appearing upon the segment of the record strip 312, shown in Fig. 5, are believed to be self-evident without further explanation. It will be observed that the off-trace lines inscribed by the first, third, fifth, seventh and ninth marking elements, include a coincident interval during which all five of the switches under observation were occupied with calls of a local character. If the chain circuit for controlling the energization of the eleventh marking element 311 is arranged, in the manner described above, so that this marking element operates when all five of the switches are occupied with calls of a local character, the period during which the all-busy condition of the switches prevails will be recorded on the record strip through operation of the eleventh marking element. More particularly, with the chain circuit arranged in this manner, an off-trace line 504 will be inscribed upon the record strip 312 by the eleventh marking element 311 for the duration of the interval during which the five switches are simultaneously occupied with local calls. Alternatively, if the chain circuit is so arranged that the eleventh marking element 311 is only operated when the five switches under observation are simultaneously busy due to toll calls routed by way thereof, the eleventh marking element will not operate to produce an indication upon the record strip when the switches are all occupied with local calls. When, however, all of the even numbered marking elements of the recorder are simultaneously operated, as indicated by the coincident portions of the off-trace lines illustrated in the upper half of Fig. 5, the chain circuit for energizing the operating magnet of the eleventh marking element 311 is completed and this marking element operates to inscribe upon the record strip an off-trace line 505. The length of this line is a measure of the time during which all of the switches under observation are simultaneously occupied with toll calls, the line being terminated immediately one of the connector switches is released to cause a point to be opened in the chain circuit over which the operating magnet of the eleventh marking element 311 is energized.

If desired, the connections may be so arranged that the respective even numbered marking elements are caused to operate when the respective associated switches are occupied with either local calls or toll calls, whereas the respective odd numbered marking elements are caused to operate only when the respective associated switches are occupied with local calls. To this end, the terminal 85 of the connections controlled by the two relays R70 and R80 is strapped to the terminal 86, the terminal 105 of the connections controlled by the two relays R90 and R100 is strapped to the terminal 106, and the terminal 125 of the connections controlled by the relays R110 and R120 is connected to the terminal 126. Corresponding strap connections are also made between the corresponding terminals of the connections controlled by the remaining two sets of test relays. With the circuits arranged in this manner, when ground potential is impressed upon the conductor 30b in response to seizure of the switch 16 over the trunk line 17, the relay R70 is energized and operates to complete the previously traced circuit for energizing the magnet 313 of the marking element 301. Also, a circuit is completed for energizing the operating magnet 314 of the second marking element 302, this circuit extending by way of the grounded conductor 30b, the terminals 33, 83, 85, 86, 84 and 330, and the winding of the magnet 314 to battery. Thus, both of the marking elements 301 and 302 are caused to operate to inscribe off-trace lines upon the record strip 312 when the connector switch 16 is seized over the trunk line 17 extending to the bank contacts of the local selector switches. When ground potential is impressed upon the conductor 30a in response to seizure of the switch 16 over the trunk line 20 extending to the toll selector switches, the relay R80 is energized and operates to complete the above-traced circuit for energizing the operating magnet 314 of the second marking element 302. In this case, no circuit is completed for energizing the operating magnet 313 of the first marking element 301. Accordingly, it will be seen that when the connector switch 16 is seized over the trunk line 20 by one of the toll selector switches having access thereto, only the second marking element 302 is caused to operate. The other four pairs of marking elements individually associated with the other four local and toll connector switches under observation are selectively operated in accordance with the routes over which they are respectively seized in a similar manner. Thus, when the connector switch associated with the pair of marking elements 303 and 304 is seized through a local switch train, both of these elements are caused to operate to inscribe an off-trace line upon the record strip 312, whereas when the associated connector switch is seized through a toll switch train, only the odd numbered marking element 303 is caused to operate.

With the apparatus arranged to operate in the manner just described, the even or odd numbered marking elements of the recorder shown in Fig. 3 may also be arranged to control the above-described chain circuit for energizing the operating magnet 318 of the eleventh marking element 311 when all five of the connector switches under observation are occupied with calls. In this case, if the armature springs controlled by the operating magnets of the respective odd numbered marking elements are shunted from the chain circuit by suitable connections so that the chain circuit is severally controlled by the even numbered marking elements, the eleventh marking element is caused to operate to indicate an all-busy condition of the five switches under observation irrespective of the routes over which these switches are respectively seized. Alternatively, if the armature springs controlled by the operating magnets of the respective even numbered marking elements are shunted from the chain circuit, the circuit is only completed when all of the odd numbered marking elements are operated and, hence, operation of the eleventh marking element indicates that all of the switches under observation are occupied with toll calls.

The character of a typical record inscribed upon a segment of the record strip 312, when the terminals 85, 86, 105, 106, 125, 126, etc., are strapped in the manner just described, is illustrated in Fig. 6 wherein the coincident off-trace lines 600 and 601 inscribed upon the record strip by the first two marking elements 301 and 302 indicate an interval during which the connector switch 16 was occupied with a local call. Following these coincident off-trace lines there appears an off-trace line 602 inscribed upon the record strip 312 by the second marking element 302. This line designates an interval during which the connector switch 16 was occupied with a toll call. In a similar manner, the coincident off-trace lines 603 and 604 indicate an interval during which the second combined local and toll connector switch was occupied with a local call, and the following off-trace line 605 inscribed upon the record strip by the fourth marking element 304 represents an interval during which the second switch under observation was occupied with a toll call. The remaining off-trace lines appearing upon the segment of the record strip shown in Fig. 6 will be self-evident in view of the foregoing explanation. As explained above, with the chain circuit for controlling the eleventh marking element 311 arranged to be completed in response to operation of the even numbered marking elements, this eleventh marking element will operate to designate an all-busy condition of the switches under observation regardless of the routes over which these switches are respectively seized. Hence, in the record portrayed on the segment of the record strip shown in Fig. 6, the two off-trace lines 606 and 607 inscribed upon the record strip by the eleventh marking element represent intervals during which all five of the switches under observation were occupied with calls of one type or the other. Had the eleventh marking element been connected to operate only when all of the odd numbered marking elements were operated, only the off-trace line 606 would have been inscribed upon the record strip, which off-trace line would in such case, represent an interval during which all of the switches under observation were busy with local calls. In the latter case, the off-trace line 607 would not appear upon the record strip.

The circuit connections controlled by the test relays may be further modified so that the odd numbered marking elements operate when the respective associated switches are occupied with both local and toll calls and the even numbered marking elements operate only when the respective associated switches are occupied with toll calls. To this end, the terminals 85, 86, 105, 106, 125, 126, etc., of the circuit connections controlled by the respective test relays are left unstrapped, the terminal 75 is strapped to the terminal 76, the terminal 95 is strapped to the terminal 96, the terminal 115 is strapped to the terminal 116, and so on. With the circuit terminal straps arranged in this manner, when the combined local and toll connector switch 16 is seized over the trunk line 20 extending to the bank contacts of the various toll selector switches and ground potential is impressed upon the private conductor section 30a, the previously traced circuit is completed for energizing the relay R80, which relay operates to connect the private conductor sections 30a and 30b together and to complete the above-described operating circuit for the operating magnet 314 of the second marking element 302. When ground potential is impressed upon the conductor 30a through seizure of the trunk line 20, a circuit is also completed for energizing the operating magnet 313 of the first marking element 301, this circuit extending by way of the grounded conductor 30a, the terminals 32, 73, 75, 76, 74 and 327, and the winding of the magnet 313 to battery. Thus, when the connector switch 16 is seized over the trunk line 20, extending to the toll selector switches, both of the marking elements 301 and 302 are caused to operate to inscribe off-trace lines upon the record strip 312. Alternatively, if the switch 16 is seized over the trunk line 17 accessible only to the local selector switches and the control apparatus thereof operates to impress ground potential upon the private conductor section 30b, the previously traced circuit for energizing the relay R70 is completed, which relay, upon operating, completes the above-described circuit for energizing the operating magnet 313 of the first marking element 301. In this case, no circuit is completed for energizing the operating magnet of the second marking element 302. Accordingly, only the first marking element 301 is caused to operate to inscribe an off-trace line upon the record strip 312 when the switch 16 is seized by a local selector switch. In a similar manner, the circuit connections controlled by the other pairs of test relays may be arranged so that both the even and odd numbered marking elements individually associated with the other switches under observation are caused to operate when the associated switches are occupied with toll calls, whereas only the odd numbered marking elements are caused to operate when the respective associated switches are seized through local switch trains. Here again, the chain circuit for controlling the eleventh marking element 311 may be so arranged that this marking element operates when all of the other odd numbered marking elements are operated or when all of the even numbered marking elements are operated, as desired. In this case, if the chain circuit is arranged so that the eleventh marking element is operated only when the operating magnets of the respective odd numbered marking elements are all operated, the eleventh marking element functions to inscribe an off-trace line upon the record strip 312 when all of the switches under observation are busy regardless of the route over which the switches are respectively seized. Alternatively, if the chain circuit is arranged to be completed when the respective even numbered marking elements are all operated, the eleventh marking element functions to inscribe an off-trace line upon the record strip only when the five switches under observation are all occupied with local calls.

The character of a typical record obtained when the terminals 75, 76, 95, 96, 115, 116, etc., are strapped in the manner just described is illustrated in Fig. 7 wherein the coincident off-trace lines 701 and 702 inscribed upon the record strip 312 by the first and second marking elements 301 and 302, respectively, represent a time interval during which the connector switch 16 was occupied with a toll call, and the following off-trace line 703 inscribed upon the record strip by the first marking element 301 represents a time interval during which the connector switch 16 was occupied with a local call. Similarly, the coincident off-trace lines 704 and 705 inscribed upon the record strip by the third and fourth marking elements 303 and 304, respectively, indicate a time interval during which the second combined local and toll connector switch was occupied with a toll call, and the following off-trace line 706 traced upon the record strip by the third marking element 303 indicates a time interval during which the second connector switch was occupied with a local call. The remaining off-trace lines delineated upon the record strip 312 by the marking elements individually associated with the other switches under observation will be self-evident in view of the foregoing explanation. It will be apparent from the composite arrangement of the off-trace lines appearing in Fig. 7 that during two intervals all of the switches under observation were simultaneously busy. During the first of these intervals the switches were all occupied with toll calls, whereas during the second interval the switches were all occupied with local calls. Assuming that during the test period the chain circuit for energizing the operating magnet 318 of the eleventh marking element 311 was arranged to be completed when all of the odd numbered marking elements were operated, the off-trace line 707 inscribed upon the record strip 312 by the marking element 311 indicates the first interval during which all of the switches were busy and the second off-trace line 708 represents the second interval during which all of the switches were busy. Since, however, during the test period just considered, the odd numbered marking elements were arranged to operate when both local and toll calls were routed by way of the respective associated switches, the all-switch-busy designations 707 and 708 give no indication concerning the type of calls routed through the switches under observation. If, during the test period, the strap connections were so arranged that the chain circuit was completed only when all of the even numbered marking elements were operated, only the off-trace line 707 appears upon the completed record, this line representing an all-switch-busy condition of the switches under observation occasioned by toll calls routed by way thereof.

In order to obtain records of calls routed to a particular line of the system shown in Fig. 1, and abandoned due to a busy condition of the line, it is necessary to equip each of the line selecting switches having access to the line with apparatus for establishing an auxiliary circuit when the line under observation is selected. Apparatus suitable for this purpose is illustrated in Fig. 4 wherein certain of the elements of the mechanism of a Strowger switch are fragmentarily shown. Briefly described, the switch comprises two banks of contacts 401 and 402, commonly known as line switching and private banks, which are arranged in levels and are arranged to be mounted upon a supporting structure which includes two rods 403 and 404. Two sets of wipers 405 and 406 are provided which are carried by a shaft 407 by means of which the wipers are adapted to be operated into engagement with corresponding contacts of the respective associated contact banks 401 and 402 An additional operating mechanism, not shown, comprising the usual vertical and rotary magnets, together with appropriate ratchet and pawl mechanisms associated with the shaft 407, is provided for positioning the wiper sets 405 and 406 in engagement with the desired contacts of a desired level. As indicated previously, the normal operation of the switch, the shaft 407 is first elevated step by step in a vertical direction with the wipers 405 and 406 at rotary normal in order to position the wipers opposite a desired level of contacts. Thereafter, the shaft 407 is rotated step by step to position the wipers 405 and 406 in engagement with the contacts of a particular set in the selected level. With this arrangement, each set of contacts in each level represents a particular line outgoing from the switch. In order to establish the auxiliary circuit mentioned above when the wipers 405 and 406 are positioned in engagement with a set of contacts representing a line under observation, the shaft 407 is equipped with an additional wiper set 408 insulated from the shaft in any suitable manner and oppositely disposed with respect to the wipers of the sets 405 and 406. The wipers of the wiper set 408 are adapted to engage a contact carried by a bracket 409 which may be detachably mounted in either of two positions and by means of bolts or screws 410 upon a clamping element 411. The arrangement for alternatively mounting the bracket 409 in either of two positions upon the clamping element 411 is utilized in order that the bracket may easily be placed in positions corresponding to the uppermost and lowermost levels of the contact banks 401 and 402. The clamping element 411 includes two curved clamping elements 411a and 411b which are adapted to be clamped to the supporting rod 403 in any desired position by tightening a screw 412 extending through the shank of the clamping element 411a and threaded into the shank of the clamping element 411b. In mounting the bracket and clamping assembly upon the rod 403 the bracket 409 is insulated from the rod 403 in any suitable manner. The bracket piece 409 is provided with a slot 413, and is of curved configuration, the curvature thereof conforming to the arc traversed by the wipers of the wiper set 408 during rotary movement of the shaft 407. A contact assembly 414 which includes a contact element 415 adapted to be engaged by the wipers of the wiper set 408 is also provided, the entire assembly being slidable along the slot 413 to position the contact element to be engaged by the wipers 408 at the desired point in the rotary movement of the wipers. The contact element 415 is provided with an enlarged head portion 415a which acts as a stop for a washer 416, and is threaded along its length to receive an assembly nut 417. In order firmly to mount the contact element 415 in any desired position along the slot 413 of the bracket 409, the threaded portion of this element with the washer 416 thereon is inserted through the slot 413 in the desired radial position and the nut 417 is screwed into engagement with the back side of the bracket piece 409. For the purpose of making connections to the contact element 415, the enlarged head 415a thereof is tapped and threaded to receive a terminal screw 418, which, in combination with a washer 419, provides a convenient terminal assembly. In order to make connections with the wipers of the set 408, a flexible pigtail connector 421 connected to one of the wipers 408 and terminating in a clip 420 is provided. With the above-described arrangement, it will be apparent that with the wiper set 408 conveniently mounted upon the shaft 407, the wipers thereof may be arranged to engage the contact element 415 when the wipers 405 and 406 are moved to engage the contacts of a contact set terminating any desired line by suitably adjusting the position of the clamping element 411 vertically along the rod 403 and by suitably positioning the contact assembly 414 radially along the slot 413 of the bracket piece 409. Hence, the contact element 415 may be positioned to be engaged by the wipers 408 when the switch is operated to select any one of the lines to which it has access.

When it is desired to make observations on a line to determine the number of calls routed to the line during intervals when the line is busy, each of the selector switches having access to the line is equipped with an attachment of the character illustrated in Fig. 4 and described in the preceding paragraph. For example, if observations are to be made with respect to the subscriber's line 10, each of the connector switches 14 and 16 having access thereto is provided with one of the attachments shown in Fig. 4. All of the other connector switches having access to this line are similarly equipped. Moreover, the attachments as installed on these connector switches are so adjusted that when any one of the switches operates to select the line 10, the wipers 408 of the associated attachment are operated into engagement with the associated contact element 415. Thus, the combined local and toll connector switch 16 is diagrammatically illustrated as being equipped with an attachment comprising the auxiliary wiper 408a which is adapted to engage the contact 415a when the wipers of the switch are positioned on the contacts terminating the conductors of the line 10. Similarly, the local connector switch 14 is schematically shown as including an auxiliary wiper 408b which is adapted to engage an associated contact 415b when the wipers of the switch are positioned on the contacts terminating the line 10. Further to prepare the apparatus to perform the type of test under consideration, the pigtail connections 421 of the various attachments are all connected to ground and the contacts 415 are individually included in the previously mentioned branches of the circuit for energizing the two relays R220 and R230 in series. Thus, the terminal 34 extending to the contact 415a may be connected to the terminal 244 of the resistor 241 and the terminal 35 extending to the contact 415b may be connected to the terminal 245 of the resistor 242. Also, the private or release conductor 23 of the line 10 is opened at the distributing frame so that it is divided into two sections 23a and 23b, respectively, extending to the line switch 12 and to the multipled bank contacts of the connector switches having access to the line 10. The terminal 26 terminating the private conductor section 23a is connected to the terminal 73 of the circuit connections controlled by the relay set comprising the two relays R70 and R80, while the terminal 27 which terminates the private conductor section 23b is connected to the terminal 83 of the indicated circuit connections. The terminal 84 of the circuit connections controlled by the two relays R70 and R80 is connected to the terminal 246 of the resistor 243. Finally, the terminals 247 and 248 are connected to the terminals 330 and 333, respectively, of the operating magnets 314 and 315, respectively embodied in the marking elements 302 and 303.

With the apparatus connected and arranged in the manner just described if a call is initiated on the line 10, the line switch 12 operates in the manner previously explained to impress ground potential upon the private conductor section 23a, thereby to complete a circuit for energizing the relay R80. This circuit may be traced as extending by way of the grounded conductor 23a, the terminals 26 and 73, RA71 and the winding of R80 to battery. Upon operating, the relay R80 completes the previously traced path for connecting the private conductor sections 23a and 23b together, thereby to impress ground potential upon the private conductor section 23b and to mark the calling line as busy in the bank contacts of the connector switches having access thereto. When the relay R80 operates, it also completes one of the branches of the circuit for energizing the two relays R220 and R230 in series, the completed branch extending by way of the grounded conductor 23a, the terminals 26 and 73, RA71, RA82, RA81, the terminals 84 and 246, the resistor 243, the winding of R230 and the winding of R220 to battery. Due to the relatively high resistance of the resistor 243, the marginal relay R230 does not operate when this branch circuit is alone completed. The more sensitive relay R220, on the other hand, operates to complete at RA221 an obvious circuit for energizing the relay R200, which relay and the relay R210 operate in sequence to initiate the operation of the recorder driving motor and the time stamp 205 in the manner previously explained. In this type of testing and recording operation the relay R210 is not connected to control one of the marking elements of the recorder. At RA222 the relay R220 completes a circuit for energizing the operating magnet 314 of the second marking element 302, this circuit extending from ground at RA222 by way of the strapped terminals 247 and 330 and the winding of the magnet 314 to battery. As a result, the marking element 302 is operated to its off-normal position to inscribe an off-tract line upon the record strip 312. Since the relays R70 and R220 are maintained energized over the previously traced circuits for the duration of the call and until the line switch 12 is released at the end of the call, it will be apparent that a continuous off-trace line is inscribed upon the record strip 312 by the marking element 302 until the call is terminated and the operated switch train is released. If during this interval a call is routed to the busy line 10 through one of the connector switches having access thereto, the third marking element 303 is caused to operate to record the call. For example, if a connection is routed to the line 10 through the local connector switch 14 at a time when this line is busy, a second branch of the circuit for energizing the relays R220 and R230 in series is completed when the wipers of the connector switch 14 are positioned on the contacts terminating the conductors of the line 10. This branch circuit may be traced as extending by way of the grounded pigtail connection 421b, the wiper 408b and its associated contact 415b, the terminals 35 and 245, the resistor 242 and the series connected windings of R230 and R220 to battery. When this second branch circuit is completed, the resistance of the circuit serially including the respective windings of R220 and R230 is materially reduced. As a consequence, the marginal relay R230 is caused to operate. Upon operating, this relay completes, at RA231, a circuit for energizing the operating magnet 315 of the third marking element 303, this circuit extending from ground at RA222 by way of RA231, the terminals 248 and 333 and the winding of the magnet 315 to battery. When this circuit is completed, the pen of the marking element 303 is deflected to its off-normal position to inscribe an off-trace line upon the record strip 312. Thereafter and when the connection as routed through the connector switch 14 to the busy line 10 is released, the second branch of the series circuit for energizing the two relays R220 and R230 is interrupted at the wiper 408b and its associated contact 415b. As a result, the resistance of the circuit including the respective windings of the relays R220 and R230 is increased to an extent such that the marginal relay R230 restores. Upon restoring, this relay opens, at RA231, the above-traced operating circuit for the magnet 315, whereby the marking pen of the element 303 is returned to its normal position and the off-trace line is ended. Thus, it will be apparent that the third marking element 303 responds to each call routed to the line 10, at a time when this line is occupied with an outgoing call, by operating to inscribe an off-trace line upon the record strip 312. When the relay R220 restores it not only functions to open the operating circuit for the magnet 314 but, in addition, interrupts, at RA221, the operating circuit for the relay R200, causing this relay and R210 sequentially to restore. The relay R200, upon restoring, opens a point in the circuit for energizing the operating magnet of the time stamp 205 and interrupts, at RA212, the circuit for energizing the driving motor of the recorder. Thus, movement of the record strip 312 is arrested until another call involving the line 10 is initiated.

In a similar manner, if the line 10 is engaged with a call routed thereto from a calling one of the other substations in the system, the second marking element 302 functions to record the time interval during which the line 10 is occupied with the call and the third marking element 303 operates to record each unsuccessful call routed to this line while the line is busy. For example, if a call is routed to the line 10 through the combined local and toll connector switch 16 at a time when the line is idle, one of the branches of the circuit for energizing the two relays R220 and R230 is completed shortly after the wipers of the connector switch 16 are positioned on the contacts terminating the conductors of the line 10. This branch circuit may be traced as extending by way of the grounded pigtail connection 421a, the wiper 408a and its associated contact 415a, the terminals 34 and 244, the resistor 241 and the series connected windings of the relays R230 and R220 to battery. When energized over this circuit, the relay R220 operates to complete the previously traced operating circuit for the magnet 314 of the second marking element 302, while the marginal relay R230 remains in its restored position. As a consequence, the pen of the marking element 302 is deflected to its off-normal position to inscribe an off-trace line upon the record strip 312. A further consequence of the seizure of the line 10 by the connector switch 16 is the application of ground potential to the private conductor 23 thereof, thereby to mark the line 10 as busy in the bank contacts of the other connector switches having access thereto. This ground potential is impressed upon the section 23b of the private conductor 23 so that a circuit is completed for energizing the relay R70, this circuit extending by way of the grounded conductor 23b, the terminals 27 and 83, R481 and the winding of R70 to battery. When energized over this circuit, the relay R70 functions to connect the private conductor sections 23a and 23b together in the manner previously explained. In this case, the terminal 74 of the circuit connections controlled by the two relays R70 and R80 is open-circuited so that the operation of the relay R70 in no way affects the recorder shown in Fig. 3. With the apparatus in this condition, namely, with the second marking element 302 operated, if a second call is routed to the line 10 through another of the connector switches, the third marking element 303 is caused to operate. For example, if a call is routed to the line 10 through the local connector switch 14 the previously traced branch of the circuit for energizing the relays R220 and R230 is completed when the wipers of the indicated local connector switch are positioned on the contacts terminating the conductors of the line 10. With two of the branches of the operating circuit for the two relays R220 and R230 completed, the marginal relay R230 operates to complete the previously traced circuit for energizing the operating magnet 315 of the third marking element 303, whereby a record is made of the call routed to the busy line 10.

As an adjunct to the testing and indicating operations just described, another of the marking elements may be arranged to be controlled by one of the line test relays R40, R50, etc., so that a complete record of the operations performed incident to the completion of a connection involving the line under observation may be obtained. In this manner it is possible to determine whether the line under observation is primarily occupied with incoming or outgoing calls as well as to determine the number of calls lost due to a busy condition of the line. For example, in the case just described wherein the line 10 is the line under observation, the test relay R40 may be serially included in one side of this line and arranged to control the operation of the first marking element 301 in the manner previously described with reference to the operation of the test relays R40, R50 and R60. When arranged in this manner, the marking element 301 functions to record dialing, ringing and other operations occurring incident to the completion of connections resulting from incoming and outgoing calls involving the line 10.

A typical record obtained with the three marking elements 301, 302 and 303 connected to perform the functions described in the immediately preceding paragraphs is portrayed in Fig. 8 wherein the off-trace line 801 inscribed upon the record strip 312 by the second marking element 302 represents an interval during which the line 10 was busy. The off-trace lines indicated at 802 and inscribed upon the record strip 312 by virtue of successive momentary deflections of the first marking element 301 indicate the ringing interval during which ringing current was repeatedly projected over the line 10, thus identifying the call as a call incoming to the line 10. The continuous off-trace line 803 inscribed upon the record strip 312 by the first marking element 301 designates the holding time of the call, the end of this off-trace line being substantially coincident with the end of the off-trace line 801 and representing the instant at which the connection was released. During the interval when the line was occupied with the call, two operations of the third marking element 303 occurred, these operations being indicated by the off-trace lines 804 and 805, respectively, which lines shown that two calls were routed to the line 10 during the interval when the line was occupied with the first call.

The record portrayed upon the segment of the record strip 312 shown in Fig. 9 is similar to that illustrated in Fig. 8 in that the off-trace line 901 inscribed upon the record strip by the second marking element 302 represents an interval during which the line 10 under observation was occupied with a call, and the three off-trace lines 902, 903 and 904 inscribed upon the record strip by the third marking element indicate that three calls were routed to the line 10 while the line was busy. In this record, the four off-trace lines 905 caused by momentary deflections of the pen embodied in the first marking element 301, indicate the dialing of the first digit of four impulses while the off-trace lines 906 and 907, respectively, indicate two additional series of impulses transmitted by way of the line 10 under observation. The off-trace line 908 caused by momentary operation of the marking element 301, indicates the instant at which the call was answered at the called substation, and the off-trace line 909 caused by another momentary deflection of the marking element 301 indicates the instant at which the called subscriber replaced his receiver upon its supporting hook. Thus, the call responsible for the busy condition of the line 10 is clearly identified as a call originating at the substation A associated with the line 10. In other words, the record of Fig. 9 shows that a call originating on the line 10 was responsible for the three lost calls represented by the off-trace lines 902, 903 and 904, and routed to the line 10 during the period when this line was busy.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination with a line adapted to be utilized in a connection between two stations of a signaling system, indicating apparatus, means operative in response to the initiation of a call on said line for causing said apparatus to indicate the busy condition of said line for the duration of said call, and means for causing said apparatus to indicate the total number of calls routed to said line during the time interval said line is occupied with said call.

2. In combination with a line adapted to be utilized in a connection between two stations of a signaling system, recording apparatus, means operative in response to the initiation of a call on said line for causing said apparatus to record the duration of said call, and means for causing said apparatus to record each call routed to said line during the time interval said line is occupied with said call.

3. In combination with a line adapted to be utilized in a connection between two stations of a signaling system, a pair of indicating devices, means operative in response to the initiation of a call on said line for causing one of said devices to indicate the busy condition of said line for the duration of said call, and means for causing the other of said indicating devices to indicate the total number of calls routed to said line during the time interval said line is occupied with said call.

4. In combination with a line adapted to be utilized in a connection between two stations of a signaling system, a pair of indicating devices, means operative in response to the initiation of a call on said line for causing the operation of one of said devices for the duration of said call, and means for causing the operation of the other of said devices each time a call is routed to said line during the time interval said line is occupied with said call.

5. In combination with a line adapted to be utilized in a connection between two stations of a signaling system, indicating apparatus, a pair of relays each including a winding, one of said relays being of the marginal type, an operating circuit serially including said windings and completed when said line becomes busy, thereby to cause the operation of the other of said relays, means responsive to the operation of said other relay for causing said indicating apparatus to indicate the busy condition of said line, means operative to reduce the resistance of said circuit when a call is routed to said line at a time when said line is busy, thereby to cause the operation of said one relay, and means responsive to the operation of said one relay for causing said indicating apparatus to indicate said call.

6. In combination with a line adapted to be utilized in a connection between two stations of a signaling system including a pair of automatic switches each operative to select said line, a pair of control devices, means operative in response to the operation of one of said switches to select said line for causing the operation of one of said control devices, an indicating device operative in response to the operation of said one control device, means operative in response to the operation of the other of said switches to select said line for causing the operation of the other of said control devices only in the event said one control device is operated, and an indicating device operative in response to the operation of said other control device.

7. In combination with a line adapted to be utilized in a connection between two stations of a signaling system including a pair of automatic switches each operative to select said line, a pair of relays each including a winding, one of said relays being of the marginal type, an operating circuit serially including said windings, means operative in response to the operation of one of said switches to select said line for completing said circuit, thereby to cause the operation of the other of said relays, an indicating device operative in response to the operation of said other relay, means operative in response to the operation of the other of said switches to select said line for decreasing the resistance of said circuit, thereby to cause the operation of said one relay, and an indicating device operative in response to the operation of said one relay.

8. In combination with a line adapted to be utilized in a connection between two stations of a signaling system including an automatic switch operative to select said line, a pair of control devices, means operative in response to the initiation of a call on said line for causing the operation of one of said control devices, an indicating device operative in response to the operation of said one control device, means operative in response to the operation of said switch to select said line for causing the operation of the other of said control devices in the event said one control device is operated, and an indicating device operative in response to the operation of said other control device.

9. In combination with a line adapted to be utilized in a connection between two stations of a signaling system including an automatic switch operative to select said line, a pair of relays each including a winding, one of said relays being of the marginal type, an operating circuit serially including said windings, means operative in response to the initiation of a call on said line for completing said circuit, thereby to cause the operation of the other of said relays, an indicating device operative in response to the operation of said other relay, means operative in response to the operation of said switch to select said line for decreasing the resistance of said circuit, thereby to cause the operation of said one relay, and an indicating device operative in response to the operation of said one relay.

10. In combination with a subscriber's line terminating in a numerical switch and a non-numerical switch of a telephone system and including a private conductor having a section extending to said numerical switch and a section extending to said non-numerical switch, a pair of control devices, means operative in response to the initiation of a call on said line for connecting said release conductor sections together and for causing the operation of one of said control devices, an indicating device operative in response to the operation of said one control device, means operative in response to the operation of said numerical switch to select said line for causing the operation of the other of said control devices in the event said one control device is operated, and an indicating device operative in response to operation of said other control device.

11. In combination with a subscriber's line terminating in a numerical switch and a non-numerical switch of a telephone system and including a private conductor having a section extending to said numerical switch and a section extending to said non-numerical switch, a pair of relays each including a winding, one of said relays being of the marginal type, an operating circuit serially including said windings, means operative in response to the initiation of a call on said line for connecting said private conductor sections together and for completing said operating circuit, thereby to cause the operation of the other of said relays, an indicating device operative in response to the operation of said other relay, means operative in response to the operation of said numerical switch to select said line for reducing the resistance of said circuit, thereby to cause the operation of said one relay, and an indicating device operative in response to the operation of said one relay.

12. In combination with a subscriber's line terminating in a non-numerical switch and each of a pair of numerical switches of a telephone system and including a private conductor having a section extending to said non-numerical switch and a section extending to each of said numerical switches, a pair of control devices, means operative in response to the operation of one of said numerical switches to select said line for connecting said private conductor sections together and for causing the operation of one of said control devices, an indicating device operative in response to the operation of said one control device, means operative in response to the operation of the other of said numerical switches to select said line for causing the operation of the other of said control devices in the event said one control device is operated, and an indicating device operative in response to the operation of said other control device.

13. In combination with a subscriber's line terminating in a non-numerical switch and each of a pair of numerical switches of a telephone system and including a private conductor having a section extending to said non-numerical switch and a section extending to each of said numerical switches, a pair of relays each including a winding, one of said relays being of the marginal type, an operating circuit serially including said windings, means operative in response to the operation of one of said numerical switches to select said line for connecting said private conductor sections together and for completing said circuit, thereby to cause the operation of the other of said relays, an indicating device operative in response to the operation of said other relay, means operative in response to the operation of the other of said numerical switches to select said line for decreasing the resistance of said circuit, thereby to cause the operation of said one relay, and an indicating device operative in response to the operation of said one relay.

14. In combination with a telephone line adapted to be utilized in a connection between two substations of a telephone system, a pair of indication devices, means for causing one of said devices to indicate the busy condition of said line when said line is taken for use, and means for causing the other of said devices to indicate whether said line is a calling or a called line.

15. In combination with a telephone line adapted to be utilized in a connection between two substations of a telephone system, a pair of indication devices, means for causing one of said devices to indicate the busy condition of said line when said line is taken for use, and a relay including a winding serially included in one side of said line and operative to follow interruptions in a circuit established by way of said line, the other of said indicating devices being arranged to respond to the operation of said relay, thereby to indicate whether said line is a calling or a called line.

16. In combination with a telephone line adapted to be utilized in a connection between two substations of a telephone system and including a private conductor adapted to have a predetermined potential impressed thereon when said line is made busy, a recorder including a pair of marking elements, means responsive to the application of said predetermined potential to said private conductor for causing the operation of one of said marking elements, thereby to indicate the busy condition of said line, a relay including a winding serially included in one side of said line and operative to follow interruptions in a circuit established by way of said line, and means responsive to operation of said relay for causing the other of said marking elements to operate, thereby to indicate whether said line is a calling or a called line when said line is occupied with a call.

17. In combination with a line adapted to be utilized in a connection between two stations of a signaling system, indicating apparatus, means for causing said indicating apparatus to indicate the total number of calls routed to said line at a time when said line is busy, and means for indicating whether said line is a calling or a called line when said line is made busy.

18. In combination with a line adapted to be utilized in a connection between two stations of a signaling system, a plurality of indicating devices, means for causing one of said devices to indicate a busy condition of said line, means for causing a second of said devices to indicate whether said line is a calling or a called line when said line becomes busy, and means for causing a third of said devices to indicate the total number of calls routed to said line at a time when said line is busy.

19. In combination with a line adapted to be utilized in a connection between two stations of a signaling system, a plurality of indicating devices, means operative to cause the operation of one of said devices when said line becomes busy, means for causing a second of said devices to indicate the operations performed incident to the establishment of a connection including said line, thereby to indicate whether said line is a calling or a called line, and means for causing a third of said devices to operate each time a call is routed to said line when said line is busy.

20. In combination with a line adapted to be utilized in a connection between two stations of a signaling system, a recorder including a plurality of marking elements, means for causing one of said elements to record a busy condition of said line, means for causing a second of said elements to record the operations performed incident to the establishment of a connection including said line, thereby to indicate whether said line is a calling or a called line, and means for causing a third of said elements to record the total number of calls routed to said line when said line is busy.

21. In combination with a line adapted to be utilized in a connection between two stations of a signaling system, a recorder including a plurality of marking elements, means for causing one of said elements to operate when said line becomes busy, means for causing a second of said elements to record the operations performed incident to the establishment of a connection including said line, thereby to indicate whether said line is a calling or a called line, and means for causing a third of said elements to operate each time a call is routed to said line when said line is busy.

22. In combination with a line adapted to be utilized in a connection between two stations of a signaling system, a recorder including a plurality of marking elements, means for causing one of said marking elements to operate when said line becomes busy and for holding said one marking element operated until said line is released, means for causing a second of said elements to record the operations performed incident to the establishment of a connection including said line, thereby to indicate whether said line is a calling or a called line, and means for causing a third of said elements to operate each time a call is routed to said line when said line is busy.

23. Testing and indicating apparatus comprising, in combination, a pair of terminals each adapted to have a predetermined potential impressed thereon, a pair of relays each including a winding, one of said relays being of the marginal type, an operating circuit serially including said windings and having two parallel branches respectively completed in response to the application of said predetermined potential individually to said terminals, the other of said relays being operative in response to the completion of one of said branch circuits and said one relay being operative in response to the completion of both of said branch circuits, and indicating apparatus controlled by said relays.

24. Testing and indicating apparatus comprising, in combination, a pair of terminals each adapted to have a predetermined potential impressed theeron, a pair of relays each including a winding, one of said relays being of the marginal type, an operating circuit serially including said windings and having two parallel branches respectively completed in response to the application of said predetermined potential individually to said terminals, the other of said relays being operative in response to the completion of one of said branch circuits and said one relay being operative in response to the completion of both of said branch circuits, a first indicating device operative in response to operation of said other relay, and a second indicating device operative in response to operation of said one relay.

25. Testing and recording apparatus comprising, in combination, a pair of terminals each adapted to have a predetermined potential impressed thereon, a pair of relays each including a winding, one of said relays being of the marginal type, an operating circuit serially including said windings and having two parallel branches respectively completed in response to the application of said predetermined potential individually to said terminals, the other of said relays being operative in response to the completion of one of said branch circuits and said one relay being operative in response to the completion of both of said branch circuits, and a recorder including a first marking element operative in response to operation of said other relay and a second marking element operative in response to operation of said one relay.

26. Testing and indicating apparatus comprising, in combination, a pair of relays each including a winding, one of said relays being of the marginal type, an operating circuit serially including said windings and having two parallel branches, the other of said relays being operative in response to completion of either of said branch circuits and said one relay being operative in response to completion of both of said branch circuits, a pair of terminals each adapted to have a predetermined potential impressed thereon, means responsive to the application of said predetermined potential to one of said terminals for impressing said predetermined potential on the other of said terminals and for completing one of said branch circuits, and indicating apparatus controlled by said relays.

27. Testing and indicating apparatus comprising, in combination, a pair of relays each including a winding, one of said relays being of the marginal type, an operating circuit serially including said windings and having two parallel branches, the other of said relays being operative in response to completion of either of said branch circuits and said one relay being operative in response to completion of both of said branch circuits, a pair of terminals each adapted to have a predetermined potential impressed thereon, means responsive to the application of said predetermined potential to one of said terminals for impressing said predetermined potential on the other of said terminals and for completing one of said branch circuits, means responsive to the application of said predetermined potential to said other terminal for impressing said predetermined potential on said one terminal without completing either of said branch circuits, and indicating apparatus controlled by said relays.

28. Testing and indicating apparatus comprising, in combination, a pair of relays each including a winding, one of said relays being of the marginal type, an operating circuit serially including said windings and having two parallel branches, the other of said relays being operative in response to completion of either of said branch circuits and said one relay being operative in response to completion of both of said branch circuits, a pair of terminals each adapted to have a predetermined potential impressed thereon, means responsive to the application of said predetermined potential to one of said terminals for connecting said terminals together and for completing one of said branch circuits, and indicating apparatus controlled by said relays.

29. Testing and indicating apparatus comprising, in combination, a pair of relays each including a winding, one of said relays being of the marginal type, an operating circuit serially including said windings and having two parallel branches, the other of said relays being operative in response to completion of either of said branch circuits and said one relay being operative in response to completion of both of said branch circuits, a pair of terminals each adapted to have a predetermined potential impressed thereon, means responsive to the application of said predetermined potential to one of said terminals for connecting said terminals together and for completing one of said branch circuits, means responsive to the application of said predetermined potential to said other terminal for connecting said terminals together without compleing either of said branch circuits, and indicating apparatus controlled by said relays.

30. Testing and recording apparatus comprising a plurality of test relays, a recorder including marking elements individually corresponding to said test relays and individually operative in response to operation of the respective corresponding test relays, an additional marking element in said recorder, an operating magnet for said additional marking element, an operating circuit for said magnet, a slow-acting device operative to complete said operating circuit, an operating circuit for said slow-acting device, and means responsive to operation of any one of said test relays for completing said last-named operating circuit.

31. In combination with a line selecting switch adapted to be seized over either of two different routes, indicating apparatus, means for causing said apparatus to indicate in one manner the busy condition of said switch when said switch is seized over one of said routes, and means for causing said apparatus to indicate in a different manner the busy condition of said switch when said switch is seized over the other of said routes.

32. In combination with a line selecting switch adapted to be seized over either of two different routes, a pair of indicating devices, means for causing one of said devices to operate when said switch is seized over one of said routes, and means for causing the other of said devices to operate when said switch is seized over the other of said routes.

33. In combination with a line selecting switch adapted to be seized over either of two different routes, a pair of indicating devices, means for causing one of said devices to operate when said switch is seized over one of said routes, and means for causing both of said devices to operate when said switch is seized over the other of said routes.

34. In combination with a line selecting switch adapted to be seized over any one of a plurality of different routes, a plurality of indicating devices individually corresponding to said routes, means for causing the operation of one of said devices when said switch is seized over the route corresponding to said one device, and means for causing the operation of all of said devices when said switch is seized over another of said routes.

35. In combination with a first line selecting switch adapted to be seized by either of two preceding selector switches over either of two trunk lines respectively extending to said two preceding selector switches, indicating apparatus, means for causing said apparatus to indicate in one manner the busy condition of said first switch when said first switch is seized over one of said trunk lines from one of said preceding selector switches, means controlled by said last-named means for marking said first switch as busy in the other of said preceding selector switches, and means for causing said apparatus to indicate in a different manner the busy condition of said first switch when said first switch is seized over the other of said trunk lines from said other preceding selector switch.

36. In combination with a first line selecting switch adapted to be seized by either of two preceding selector switches over either of two trunk lines respectively extending to said two preceding selector switches, a pair of indicating devices, means for causing the operation of one of said devices when said first switch is seized over one of said trunk lines from one of said preceding selector switches, means controlled by said last-named means for marking said first switch as busy in the other of said preceding selector switches, and means for causing the operation of the other of said indicating devices when said first switch is seized over the other of said trunk lines from the other of said preceding selector switches.

37. In combination with a first line selecting switch adapted to be seized by either of two preceding selector switches over either of two trunk lines respectively extending to said two preceding selector switches, a pair of indicating devices, means for causing the operation of one of said devices when said first switch is seized over one of said trunk lines from one of said preceding selector switches, means controlled by said last-named means for marking said first switch as busy in the other of said preceding selector switches, and means for causing the operation of both of said indicating devices when said first switch is seized over the other of said trunk lines from the other of said preceding selector switches.

38. In combination with a first line selecting switch adapted to be seized by a preceding selector switch over a trunk line extending between said switches and including a release conductor having one section extending to said preceding selector switch and a second section extending to said first switch and adapted to have a predetermined potential impressed thereon when said trunk line is seized, an indicating device, and means responsive to the operation of said preceding selector switch to seize said trunk line for applying said predetermined potential to said second release conductor section and for causing the operation of said indicating device.

39. In combination with a first line selecting switch adapted to be seized by a preceding selector switch over a trunk line extending between said switches and including a release conductor having one section extending to said first switch and a second section extending to said preceding selector switch, an indicating device, and means responsive to the operation of said preceding selector switch to seize said trunk line for connecting said release conductor sections together and for causing the operation of said indicating device.

40. In combination with a first line selecting switch adapted to be seized by either of two preceding selector switches over trunk lines respectively extending to said preceding selector switches, one of said trunk lines including a release conductor having one section extending to one of said preceding selector switches and adapted to have a predetermined potential impressed thereon when the other trunk line is seized and a second section extending to said first switch and adapted to have said predetermined potential impressed thereon when said one trunk line is seized, indicating apparatus, means responsive to the operation of said one preceding selector switch to seize said one trunk line for impressing said predetermined potential upon said second release conductor section and for causing said indicating apparatus to indicate in one manner the busy condition of said first switch, and means responsive to the operation of the other of said preceding selector switches to seize said other trunk line for impressing said predetermined potential upon said first release conductor section and for causing said indicating apparatus to operate in a different manner to indicate the busy condition of said first switch.

41. In combination with a first line selecting switch adapted to be seized by either of two preceding selector switches over trunk lines respectively extending to said preceding selector switches, one of said trunk lines including a release conductor having one section extending to one of said preceding selector switches and adapted to have a predetermined potential impressed thereon when the other of said trunk lines is seized and a second section extending to said first switch and adapted to have said predetermined potential impressed thereon when said one trunk line is seized, a pair of indicating devices, means responsive to the operation of said one preceding selector switch to seize said one trunk line for impressing said predetermined potential upon said second release conductor section and for causing the operation of one of said indicating devices, and means responsive to the operation of the other of said preceding selector switches to seize said other trunk line for impressing said predetermined potential upon said first release conductor section and for causing the operation of the other of said indicating devices.

42. In combination with a first line selecting switch adapted to be seized by either of two preceding selector switches over trunk lines respectively extending to said preceding selector switches, one of said trunk lines including a release conductor having one section extending to one of said preceding selector switches and adapted to have a predetermined potential impressed thereon when the other of said trunk lines is seized and a second section extending to said first switch and adapted to have said predetermined potential impressed thereon when said one trunk line is seized, a pair of indicating devices, means responsive to the operation of said one preceding selector switch to seize said one trunk line for impressing said predetermined potential upon said second release conductor section and for causing the operation of one of said indicating devices, and means responsive to the operation of the other of said preceding selector switches to seize said other trunk line for impressing said predetermined potential upon said first release conductor section and for causing the operation of both of said indicating devices.

43. In combination with a first line selecting switch adapted to be seized by either of two preceding selector switches over trunk lines respectively extending to said preceding selector switches, one of said trunk lines including a release conductor having one section extending to one of said preceding selector switches and a second portion extending to said first switch, indicating apparatus, means responsive to the operation of said one preceding selector switch to seize said one trunk line for connecting said release conductor sections together and for causing said indicating apparatus to indicate in one manner the busy condition of said first switch, and means responsive to the operation of the other of said preceding selector switches to seize said other trunk line for connecting said release conductor sections together and for causing said indicating apparatus to indicate in a different manner the busy condition of said first switch.

44. In combination with a first line selecting switch adapted to be seized by either of two preceding selector switches over trunk lines respectively extending to said preceding selector switches, one of said trunk lines including a release conductor having one section extending to one of said preceding selector switches and a second portion extending to said first switch, a pair of indicating devices, means responsive to the operation of said one preceding selector switch to seize said one trunk line for connecting said release conductor sections together and for causing the operation of one of said indicating devices, and means responsive to the operation of the other of said preceding selector switches to seize said other trunk line for connecting said release conductor sections together and for causing the operation of the other of said indicating devices.

45. In combination with a first line selecting switch adapted to be seized by either of two preceding selector switches over trunk lines respectively extending to said preceding selector switches, one of said trunk lines including a release conductor having one section extending to one of said preceding selector switches and a second portion extending to said first switch, a pair of indicating devices, means responsive to the operation of said one preceding selector switch to seize said one trunk line for connecting said release conductor sections together and for causing the operation of one of said indicating devices, and means responsive to the operation of the other of said preceding selector switches to seize said other trunk line for connecting said release conductor sections and for causing the operation of both of said indicating devices.

46. In combination with a combined local and toll connector switch adapted to be seized through a local switch train or through a toll switch train, indicating apparatus, means for causing said apparatus to indicate in one manner the busy condition of said switch when said switch is seized through said local switch train, and means for causing said apparatus to indicate in a different manner the busy condition of said switch when said switch is seized through said toll switch train.

47. In combination with a combined local and toll connector switch adapted to be seized through a local switch train or through a toll switch train, a recorder including a plurality of marking elements, means operative in response to seizure of said switch through said local switch train for causing the operation of one of said marking elements, and means operative in response to seizure of said switch through said toll switch train for causing the operation of another of said marking elements.

48. Testing and indicating apparatus comprising, in combination, a pair of terminals each adapted to have a predetermined potential thereon, indicating apparatus, means responsive to the application of said predetermined potential to one of said terminals for applying said predetermined potential to the other of said terminals and for causing said indicating apparatus to operate in one manner, and means responsive to the application of said predetermined potential to said other terminal for applying said predetermined potential to said one terminal and for causing said indicating apparatus to operate in a different manner.

49. Testing and indicating apparatus comprising, in combination, a pair of terminals each adapted to have a predetermined potential thereon, a pair of indicating devices, means responsive to the application of said predetermined potential to one of said terminals for applying said predetermined potential to the other of said terminals and for causing the operation of one of said devices, and means responsive to the application of said predetermined potential to said other terminal for applying said predetermined potential to said one terminal and for causing the operation of the other of said devices.

50. Testing and indicating apparatus comprising, in combination, a pair of terminals each adapted to have a predetermined potential thereon, a pair of normally incomplete conductive paths extending between said terminals, indicating apparatus, means responsive to the application of said predetermined potential to one of said terminals for completing one of said paths and for causing said indicating apparatus to operate in one manner, and means responsive to the application of said predetermined potential to the other of said terminals for completing the other of said paths and for causing said indicating apparatus to operate in a different manner.

51. Testing and indicating apparatus comprising, in combination, a pair of terminals each adapted to have a predetermined potential thereon, a pair of normally incomplete conductive paths extending between said terminals, a pair of indicating devices, means responsive to the application of said predetermined potential to one of said terminals for completing one of said paths and for causing one of said indicating devices to operate, and means responsive to the application of said predetermined potential to the other of said terminals for completing the other of said paths and for causing the other of said indicating devices to operate.

52. In combination with a plurality of line selecting switches each adapted to be seized over either a first route or a second route, indicating apparatus, and means for causing said indicating apparatus to indicate when all of said switches are busy due to seizure over their respective corresponding first routes.

53. In combination with a plurality of line selecting switches each adapted to be seized over either a first route or a second route; a plurality of indicating devices individually corresponding to said switches, means for causing the operation of said indicating devices only when the corresponding switches are seized over their respective corresponding first routes, an additional indicating device, and means for causing the operation of said additional indicating device when all of said plurality of indicating devices are operated.

54. In combination with a plurality of line selecting switches each adapted to be seized over a trunk line extending thereto, a plurality of indicating devices individually corresponding to said switches, means for causing the operation of said indicating devices when the corresponding switches are seized, an additional indicating device, and means controlled by said plurality of indicating devices for causing the operation of said additional indicating device only when said plurality of indicating devices are all operated.

55. In combination with a plurality of line selecting switches each adapted to be seized over either a first route or a second route, a plurality of first indicating devices individually corresponding to said switches, a plurality of second indicating devices individually corresponding to said switches, means for causing the operation of said first indicating devices only when the corresponding switches are seized over their respective corresponding first routes, means for causing the operation of said second indicating devices when the corresponding switches are seized over their respective corresponding second routes, an additional indicating device, and means for causing the operation of said additional indicating device only when all of said first indicating devices are operated.

56. In combination with a plurality of line selecting switches each adapted to be seized over either a first route or a second route, a recorder including a plurality of marking elements individually corresponding to said switches and an additional marking element, means for causing the operation of said marking elements only when the corresponding switches are seized over their respective corresponding first routes, and means for causing the operation of said additional marking element only when all of said plurality of marking elements are operated.

57. In combination with a plurality of line selecting switches each adapted to be seized over either a first route or a second route, a recorder including a plurality of marking elements individually corresponding to said switches and an additional marking element, each of said marking elements including an operating magnet, an operating circuit for each of said magnets, means for completing the operating circuits for the operating magnets of said plurality of marking elements only when the corresponding switches are seized over their respective corresponding first routes, and means severally controlled by said last-named magnets for completing the operating circuit for the operating magnet of said additional marking element when all of said plurality of marking elements are operated.

58. In combination with a plurality of line selecting switches each adapted to be seized over either a first route or a second route, a recorder including a plurality of first marking elements individually corresponding to said switches and a plurality of second marking elements individually corresponding to said switches, means for causing the operation of said first marking elements only when the corresponding switches are seized over their respective corresponding first routes, means for causing the operation of said second marking elements when the corresponding switches are seized over their respective corresponding second routes, an additional marking element in said recorder, and means for causing the operation of said additional marking element only when all of said first marking elements are operated.

59. In combination with a plurality of line selecting switches each adapted to be seized over either a first route or a second route, a recorder including a plurality of first marking elements individually corresponding to said switches and a plurality of second marking elements individually corresponding to said switches, each of said marking elements including an operating magnet, an operating circuit for each of said magnets, means for completing the operating circuits for the magnets of said first marking elements only when the corresponding switches are seized over their respective corresponding first routes, means for completing the operating circuits for the magnets of said second marking elements when the corresponding switches are seized over their respective corresponding second routes, an additional marking element in said recorder, an operating magnet for said additional marking element, an operating circuit for said last-named magnet, and means severally controlled by the operating magnets of said first marking elements for completing said last-named operating circuit when all of said first marking elements are operated.

60. Testing and indicating apparatus comprising, in combination, a plurality of pairs of terminals, each of said terminals being adapted to have a predetermined potential impressed thereon, a pair of relays associated with each pair of said terminals, each of said relays being operative in response to the application of said predetermined potential to one of the terminals of the associated terminal pair and being operative to cause said predetermined potential to be impressed upon the other terminal of the associated terminal pair, indicating devices individually corresponding to said relays and each operative in response to operation of the corresponding relay, an additional indicating element, and means operative to cause the operation of said additional indicating element when predetermined ones of said relays are operated at the same time.

61. Testing and indicating apparatus comprising, in combination, a plurality of pairs of terminals, each of said terminals being adapted to have a predetermined potential impressed thereon, a pair of relays associated with each pair of said terminals, each of said relays being operative in response to the application of said predetermined potential to one of the terminals of the associated terminal pair and being operative to cause said predetermined potential to be impressed upon the other terminal of the associated terminal pair, indicating devices individually corresponding to said relays and each operative in response to the operation of the corresponding relay, an additional indicating device including an operating magnet, and a chain circuit controlled by predetermined ones of said plurality of indicating devices for energizing said magnet when all of said predetermined indicating devices are operated.

ARTHUR T. SIGO.